TRACTOR MOUNTED HAY RAKE APPARATUS

Filed April 26, 1968 2 Sheets-Sheet 1

INVENTOR
CALVIN P. WEAVER

BY William R Jacox

ATTORNEY

Dec. 15, 1970 C. P. WEAVER 3,546,869

TRACTOR MOUNTED HAY RAKE APPARATUS

Filed April 26, 1968 2 Sheets-Sheet 2

INVENTOR
CALVIN P. WEAVER

BY William R Jacox
ATTORNEY

United States Patent Office
3,546,869
Patented Dec. 15, 1970

1

3,546,869

TRACTOR MOUNTED HAY RAKE APPARATUS

Calvin P. Weaver, 226 W. Main St.,
Tipp City, Ohio 45371

Filed Apr. 26, 1968, Ser. No. 724,366
Int. Cl. A01d 77/06
U.S. Cl. 56—377 17 Claims

ABSTRACT OF THE DISCLOSURE

A tractor mounted hay rake apparatus of the side delivery type. The rake apparatus is supported in front of a tractor by adjustable support means, such as a boom or the like. The rake apparatus includes a reel which is preferably rotated by fluid energy supplied by a fluid pump carried by the tractor which supports the rake apparatus, or by other suitable means. The reel is rotatable in one direction for raking hay and is rotatable in the opposite direction for tedding hay.

BACKGROUND OF THE INVENTION

In the past, most hay rakes have been pulled behind propulsion means. Thus, the propulsion means moves over the hay immediately prior to the raking thereof. Such movement by the propulsion means over the hay causes crushing of portions of the hay. A considerable portion of the area raked by a conventional pull-behind rake is run over by the wheels of the ordinary tractor which pulls the rake. Therefore, considerable crushing of delicate digestible leaves of the hay occurs. Thus, considerable damage to the hay ordinarily occurs by the use of a conventional pull-behind rake.

SUMMARY OF THE INVENTION

It is an object of this invention to provide hay rake apparatus which moves forwardly of its propelling means so that hay is raked by the apparatus without being crushed by engagement thereof by the propulsion means prior to the raking thereof.

It is another object of this invention to provide means for angular adjustment of rake apparatus and for adjustment of the rake apparatus with respect to the ground to obtain better raking action as raking conditions change during operation of the rake apparatus.

Another object of this invention is to provide such hay rake apparatus which is readily transversely adjustable with respect to the propulsion means.

Another object is to provide hay rake apparatus which is disposed forwardly of propulsion means so that another machine may be drawn behind the propulsion means for performing another farming operation while the raking operation is being performed.

It is another object of this invention to provide such rake apparatus which is operated by fluid motor means.

Another object of this invention is to provide such raking apparatus which can be easily and readily changed from raking operation to tedding operation.

It is another object of this invention to provide such hay rake apparatus which includes means for automatically maintaining the hay rake apparatus at a minimum spacing from the ground.

Another object of this invention is to provide such hay rake apparatus which is either left hand delivery, or right hand delivery, or both left hand and right hand delivery.

Other objects and advantages reside in the construction of parts, the combination thereof, the method of manufacture, and the mode of operation, as will become more apparent from the following description.

2

DESCRIPTION OF THE PREFERRED EMBODIMENTS

Figures 1, 2, 3:
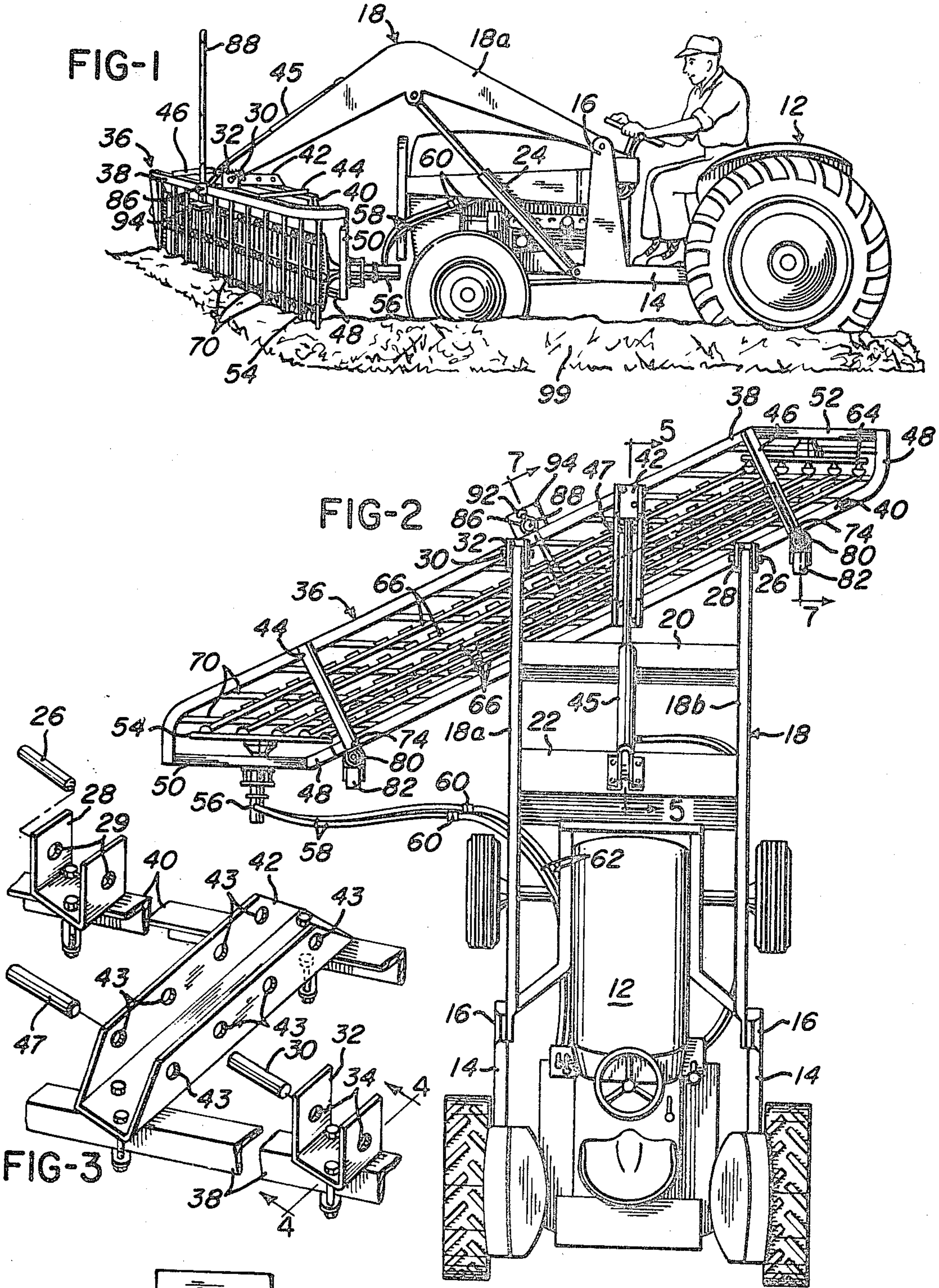
FIG. 1 is a side view showing tractor mounted hay rake apparatus of this invention.
FIG. 2 is a top plan view thereof.
FIG. 3 is an enlarged fragmentary perspective view, with parts broken away, showing connection means between propulsion means and the raking means of the apparatus of this invention.
Figure 4:
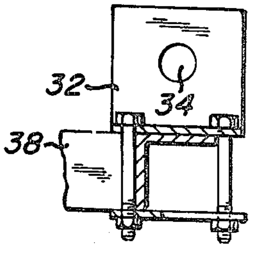
FIG. 4 is an enlarged sectional view, taken substantially on line 4—4 of FIG. 3.

Hay rake apparatus of this invention is particularly related to a tractor or the like which is provided with pivotally mounted boom means. Herein a tractor 12 has support structure 14 carried thereby. The support structure 14 is provided with pedestal members 16. A boom 18 is pivotally attached to the pedestal member 16 and carried thereby. The boom 18 comprises parallel arm members 18*a* and 18*b*, there being one arm member at each side portion of the tractor 12. A transverse member 20 and a transverse member 22 are positioned between the arm members 18*a* and 18*b* and are attached thereto.

A reciprocally operable fluid motor 24, shown in FIG. 1, is positioned at each side portion of the tractor 12 and is pivotally attached to one of the arm members 18*a* and 18*b* and is also pivotally attached to the support structure 14.

Hay rake apparatus 36 is provided with upper frame members 38 and 40, which are substantially parallel one with the other. A bracket 28 is secured to the frame member 40, and a bracket 32 is secured to the frame member 38.

The boom 18 extends forwardly of the tractor 12. A pin 26 pivotally attaches the forward end of the arm member 18*b* of the boom 18 to the bracket 28. A pin 30 pivotally attaches the forward end of the arm member 18*a* to the bracket 32. Herein the brackets 28 and 32 are shown as being short channel members within which the respective arm members 18*b* and 18*a* are positioned. The pin member 26 extends through aligned openings 29 in the bracket 28 and also extends through the arm member 18*b*. The pin member 30 extends through aligned openings 34 in the bracket 32 and also extends through the arm member 18*a*. The brackets 28 and 32 are positioned so that the pins 26 and 30 are substantially coaxial.

A connector member 42 is attached to the frame member 38 and 40 and extends therebetween, intermediate the brackets 28 and 32. The connector member 42 has a plurality of pairs of apertures 43 therein, as shown in FIG. 3. A connector member 44 and a connector member 46 are also attached to the frame members 38 and 40 and extend therebetween, adjacent opposed end portions thereof, as shown in FIG. 2.

A reciprocally operable fluid motor 45 is pivotally attached to the transverse member 22 and to the connector member 42. A bolt or pin 47, best shown in FIG. 3, extends through a pair of the apertures 43 in the connector member 42 and pivotally attaches the fluid motor 45 to the connector member 42.

Below the frame member 40 and substantially parallel therewith is a lower frame member 48, as shown in FIGS. 2, 5, 6, and 7. An inclined end frame member 50, shown in FIG. 2, joins one end of the frame member 38 to the lower frame member 48. An inclined frame member 52 joins the other end of the frame member 38 to the lower frame member 48.

A spider or wheel 54 is rotatably carried by the end frame member 50. The spider 54 has a rotary fluid motor 56 attached thereto for operation thereof. Fluid conductor members 58 extend from the fluid motor 56 to fluid conductor connector members 60 which are joined to fluid conductor members 62 which extend from a fluid pump member, not shown, and which may be carried by the tractor 12.

A wheel or spider 64 is rotatably carried by the end frame member 52. Raking bars 66 are attached to the spiders 54 and 64 and extend therebetween. Each of the raking bars 66 has a plurality of laterally spaced-apart raking teeth 68 attached thereto.

Figures 5, 6, 7, 8, 9, 10:
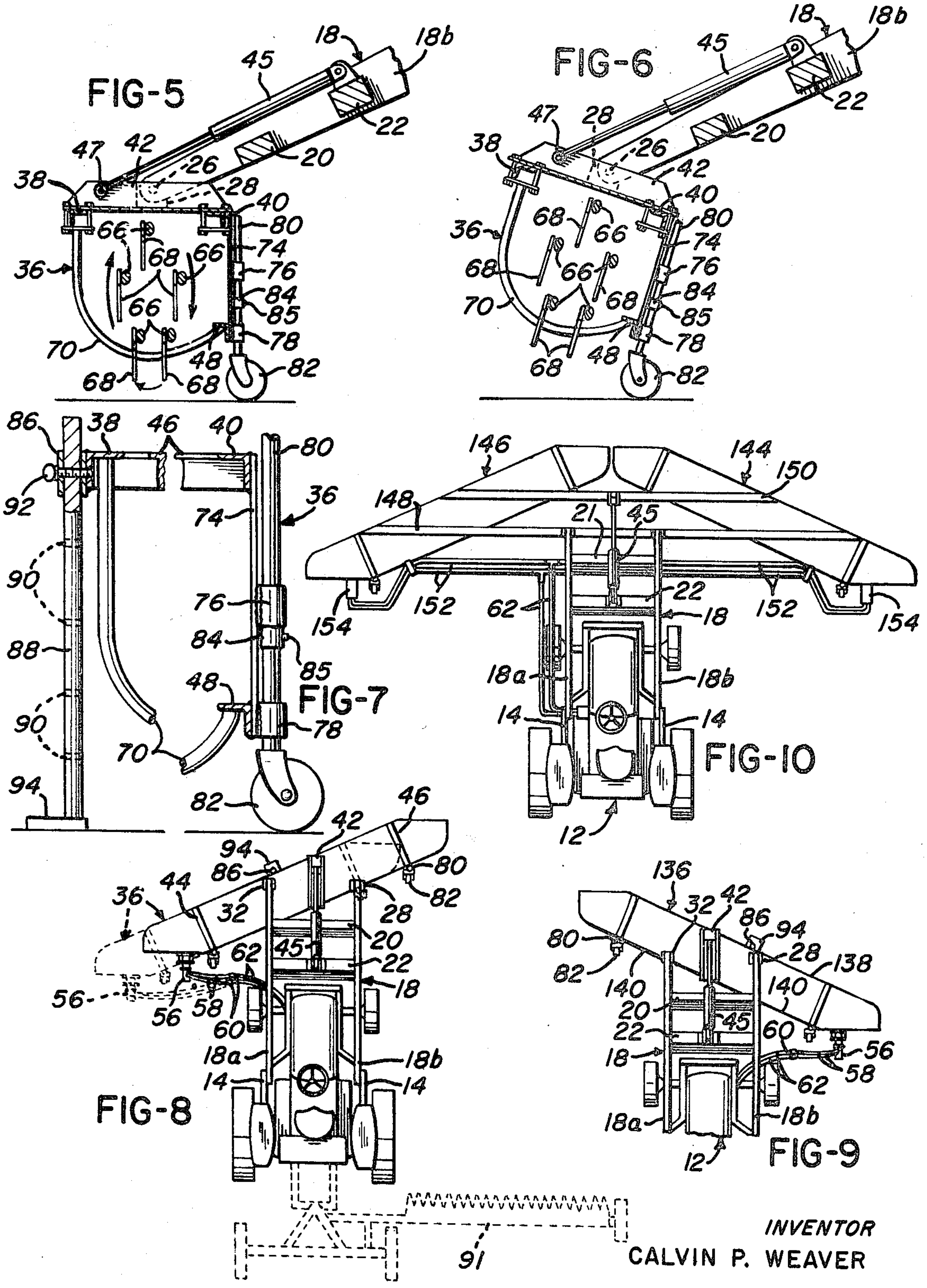
FIG. 5 is a sectional view, taken substantially on line 5—5 of FIG. 2.
FIG. 6 is a sectional view, similar to FIG. 5, but showing the apparatus in a different angular position from that shown in FIG. 5.
FIG. 7 is an enlarged sectional view, with parts broken away, taken substantially on line 7—7 of FIG. 2, but showing the adjustable leg member in a position of support.
FIG. 8 is a top plan view, drawn on a much smaller scale than FIG. 2, and illustrating the manner in which the rake apparatus is laterally adjustable with respect to the propulsion means, such adjustment being advantageous if another farming machine is to be drawn by the propulsion means and operated at the rearward portion of the propulsion means.
FIG. 9 is a fragmentary top plan view, drawn on substantially the same scale as FIG. 8, but showing rake apparatus at a different angular position with respect to the propulsion means.
FIG. 10 is a top plan view, drawn on substantially the same scale as FIGS. 8 and 9, showing two rake apparatus of this invention attached to propulsion means.

Stripping bars 70 are joined to the upper frame member 38 and to the lower frame member 48, as shown in FIGS. 5, 6, and 7.

A pair of upwardly extending strut members 74, shown in FIG. 2, are attached to the upper frame member 40 and to the lower frame member 48 and extend therebetween, as shown in FIGS. 5, 6 and 7. An upper sleeve 76 and a lower sleeve 78 are attached to each strut 74. A leg 80 slidably extends through the sleeves 76 and 78. A caster wheel 82 is attached to the lower portion of the leg 80. A collar 48 is adjustably secured to the leg 80 intermediate the sleeves 76 and 78. A set screw 85 secures the collar 84 to the leg 80. Thus, each of the legs 80 is axially slidably movable within the sleeves 76 and 78, but the extent of axial movement is limited as engagement between the collar 84 and one of the sleeves 76 or 78 occurs.

As shown in FIGS. 1, 2, and 7, a sleeve 86 is attached to the upper frame member 38. A leg 88 extends through the sleeve 86. The leg 88 is shown as having a plurality of apertures 90 extending therethrough. A bolt 92 extends through the sleeve 86 and through any one of the apertures 90 in the leg 88 to retain the leg 88 in a given axial position within the sleeve 86. The leg 88 has a foot 94 at the lower end thereof.

The leg 88 is shown in FIG. 1 in an upper position. In FIG. 7 the leg 88 is shown in a lower position, with the foot 94 on the ground for partial support of the rake apparatus 36, when the rake apparatus 36 is detached from the boom 18.

OPERATION

The operator of the tractor 12, by operation of the fluid motors 24, adjusts the height of the forward portion of the boom 18 so that the rake apparatus 36, as it is supported by the boom 18, is suitably spaced above the ground. The spacing above the ground may be chosen to be similar to that illustrated in FIG. 5. Thus, the lowermost teeth 68 are slightly spaced from the ground to engage material lying upon the ground.

Operation of the rotary fluid motor 56 causes rotation of the spider 54 and thus causes movement of the raking bars 66, which results in rotative movement of the spider 64. The raking bars 66 and the teeth 68 which are carried thereby are moved in the manner illustrated by arrows in FIG. 5. Thus, as the tractor 12 moves upon the ground, material, such as hay or the like, which is lying upon the ground is raked in the manner shown in FIG. 1. The hay is raked into a windrow 99, as shown in FIG. 1.

As the rake apparatus 36 is moved over the ground in the manner illustrated in FIG. 1, the caster wheels 82 are in engagement with the ground. The leg 80 to which each caster wheel 82 is attached is axially movable within the sleeves 76 and 78. Therefore, as the caster wheels 82 move upon uneven terrain, the caster wheels 82 move upwardly and downwardly with respect to the rake apparatus 36. If one of the caster wheels 82 should roll into an exceptionally low portion of the ground, the leg 80 to which the caster wheel 82 is attached moves axially downwardly until the collar 84 engages the lower sleeve 78. Thus, the downward movement of the caster wheel 82 is limited. If either of the caster wheels 82 rolls upon an exceptionally high portion of the ground, the leg 80 to which the caster wheel 82 is attached is moved axially upwardly until the collar 84 engages the upper sleeve 76. Thus, the caster wheel 82 and the leg 80 urge the rake apparatus 36 upwardly so that the rake apparatus 36 maintains a desired spacing from the ground over which the rake apparatus 36 travels. Thus, the teeth 68 are maintained at a desired spacing above the ground as the rake apparatus 36 is moved over ground which is level or over ground which is not level. Also, the operator of the tractor 12 by observing the position of the collar 84 with respect to the sleeves 76 and 78 is able to judge the spacing of the rake apparatus 36 from the ground during raking operation. Thus, during raking operation, the operator may adjust the boom 18 to maintain a desired spacing between the rake apparatus 36 and the ground. This is accomplished by operation of the fluid motors 24 during raking operation.

The angle of the rake apparatus 36 with respect to the boom 18 may be changed from that shown in FIG. 5 to that shown in FIG. 6 or to other angular positions by operation of the fluid motor 45. Operation of the fluid motor 45 changes the position of the forward portion of the connector member 42 with respect to the boom 18, as the connector member 42 pivotally moves about the pin 47 which attaches the connector member 42 to the boom 18. Thus, there is also pivotal movement of the brackets 32 and 28, as the brackets 32 and 28 are pivotally attached to the arms 18*a* and 18*b*, respectively. Thus, the angle of the teeth 68 with respect to the ground is changed, as shown in FIG. 6. Such change in the angle of the teeth 68 with respect to the ground causes a change in the looseness or tightness of the hay which forms the windrow 99. Such change can be made, if desired, while the raking operation is occurring.

Due to the fact that the rake apparatus 36 is attached to the boom 18 in the manner shown in the drawings and as discussed above, the rake apparatus 36 can be easily and readily attached to the boom 18 or removed therefrom. When the rake apparatus 36 is removed from the boom 18, the rake apparatus 36 is supported upon the ground by the caster wheels 82 which are attached to the legs 80 and by the foot 94 which is attached to the leg 88, as shown in FIG. 7.

The rake apparatus 36 can be operated for tedding operation by reversing the direction of rotation of the spiders 54 and 64. This is accomplished by reversing the connection of the fluid conductors 62 with respect to the fluid conductors 58 at the connector members 60. Thus, the direction of rotation of the rotary fluid motor 56 is reversed. Thus, the direction of movement of the raking bars 66 and the raking teeth 68 is opposite from that shown in FIG. 5 and tedding operation occurs, rather than raking operation.

FIG. 8 illustrates the manner in which a cutting implement 91 may be attached to the tractor 12 and drawn therebehind for cutting hay material at the rear of the tractor 12, as previously cut hay material is being raked by the rake apparatus 36 at the forward portion of the tractor 12.

FIG. 8 also illustrates the manner in which the rake apparatus 36 can be located at a different lateral position with respect to the tractor 12. The brackets 28 and 32 and the connector member 42 are released from the positions thereof shown in FIG. 2 and are moved along the length of the frame members 38 and 40 to the left and then re-secured to the frame members 38 and 40. Thus, the rake apparatus 36 is disposed at a different lateral position with respect to the boom 18 and with respect to the tractor 12.

FIG. 9 shows rake apparatus 136 which is right hand delivery rake apparatus, rather than the left hand delivery rake apparatus 36, so that a windrow is formed at the right side of the rake apparatus 136. The rake apparatus 136 is attached to the boom 18 by the bracket 28 which is attached to a frame member 138 and by the bracket 32 which is attached to a frame member 140. Also, the connector member 42 is joined to the frame members 138 and 140.

FIG. 10 shows a rake apparatus 144 and a rake apparatus 146 arranged for propulsion by the tractor 12. The boom 18 has a cross member 148 attached thereto. The cross member 148 is secured to the rake apparatus 146 and to the rake apparatus 144. The fluid motor 45 is pivotally attached to a cross member 150, which is also attached to the rake apparatus 144 and to the rake apparatus 146. Thus, the angle of the rake apparatus 144 and 146 with respect to the ground is changed by operation of the fluid motor 45.

The fluid conductors 62, which extend from a fluid pump, not shown, are connected to fluid conductors 152 which extend to a rotary fluid motor 154 of the rake apparatus 144 and to a rotary fluid motor 154 of the rake apparatus 146. Thus, as the tractor 12 moves forwardly and as the rotary fluid motors 154 are operated, a windrow is formed to the left of the tractor 12 and a windrow is formed at the right of the tractor 12.

Thus, it is understood that the hay rake apparatus of this invention is quickly and readily attached to the front portion of a tractor which is provided with a boom. The rake apparatus is adjustable with respect to the tractor and with respect to the ground. The rake apparatus is also readily laterally adjustable with respect to the tractor. The rake apparatus is attachable to the boom of the tractor for delivery at the right side of the tractor or rake apparatus is attachable to the boom of the tractor for delivery at the left side of the tractor, or rake apparatus is attachable to the boom for both left hand and right hand delivery.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

The invention having thus been described, the following is claimed:

1. In combination with a tractor provided with a boom and means for movement thereof, the boom having a plurality of arms, each of the arms extending forwardly of the tractor, there being a reciprocally operable fluid motor attached to the boom, rake apparatus including, a first frame member extending transversely with respect to the tractor, a second frame member extending transeversely with respect to the tractor, means pivotally attaching one of the arms of the boom to the first frame member, means pivotally attaching another arm of the boom to the second frame member, means pivotally attaching the reciprocally operable fluid motor to at least one of the frame members, rotary raking means carried by the frame members, means for operation of the raking means.

2. The rake apparatus of claim 1 in which fluid pump means are carried by the tractor, the means for operation of the rotary raking means including rotary fluid motor means, fluid conductor means joining the fluid pump means to the rotary fluid motor means.

3. The rake apparatus of claim 2 in which the fluid conductor means comprises a pair of fluid conductor members extending between the fluid pump means and the rotary fluid motor means, the fluid conductor members being reversible intermediate the rotary fluid motor means and the fluid pump means so that the direction of operation of the rotary fluid motor means is reversed and thus the direction of operation of the rotary raking means is reversed, so that the raking means can be operated for raking hay or for tedding hay.

4. The rake apparatus of claim 1 in which the means attaching each of the arms of the boom to its respective frame member includes a bracket attached to the frame member and a pin pivotally connecting the arm to the bracket.

5. The rake apparatus of claim 4 in which the pin pivotally connecting each arm to its respective bracket is substantially coaxial with each other pin which connects its respective arm to its respective bracket.

6. The rake apparatus of claim 1 in which the means pivotally attaching the reciprocally operable fluid motor to at least one of the frame members includes a connector member attached to the first frame member and to the second frame member, a pin pivotally joining he reciprocally operable fluid motor to the connector member, operation of the fluid motor thus changing the angle of the frame members with respect to the boom.

7. The rake apparatus of claim 1 in which there is a third frame member substantially parallel with one of the other frame members and disposed therebelow, a strut joining the third frame member to the frame member thereabove, a pair of substantially coaxial spaced-apart sleeves attached to the strut, one sleeve being above the other sleeve, a leg slidably extending through the sleeves, a collar attached to the leg between the sleeves and limiting axial movement of the leg as the collar engages one of the sleeves, a wheel attached to the leg below the lowermost sleeve.

8. The rake apparatus of claim 7 in which the strut joins the third frame member to the second frame member, an upwardly extending leg attached to the first frame member and axially adjustably movable upwardly and downwardly.

9. The rake apparatus of claim 4 in which each bracket member is adjustably movable along its respective frame member so that the rake apparatus is laterally adjustably movable with respect to the boom.

10. Rake apparatus for attachment to a tractor having boom means carried thereby forwardly thereof, the tractor also having fluid pump means, there being reciprocally operable fluid motor means attached to the boom means, the rake apparatus including frame means, rotary rake means carried by the frame means, rotary fluid motor means for operation of the rake means, bracket means attached to the frame means, means pivotally connecting the bracket means to the boom means, connector means attached to the frame means, means pivotally connecting the connector means to the reciprocally operable fluid motor means for adjusting the angular position of the frame means with respect to the boom means, fluid conduit means joining the rotary fluid motor means to the fluid pump means of the tractor.

11. The rake apapratus of claim 10 which includes a plurality of axially movable leg members attached to the frame means, wheel means attached to the leg members and in engagement with the ground over which the apparatus moves.

12. The rake apparatus of claim 11 in which each of the leg members has limit means attached thereto for limiting the axial movement thereof, while permitting limited axial movement thereof.

13. The rake apparatus of claim 10 which includes a vertically adustable leg member which has a foot at the lower end thereof.

14. The apparatus of claim 10 in which the frame means includes a forward frame member and a rearward frame member, the boom means having a pair of arms each of which has a forward end portion at a given distance forward of the tractor, a bracket member pivotally attaching the forward frame member to the forward portion of one of the arms, a bracket member pivotally attaching the rearward frame member to the forward portion of the other arm.

15. The rake apparatus of claim 10 in which the bracket means are adjustably movable along the frame means so that the lateral position of the frame means with respect to the boom means is adjustable.

16. The apparatus of claim 10 which includes means carried by the tractor for upward and downward movement of the boom means so that the spacing between the rake apparatus and the ground is adjustable thereby.

17. Raking apparatus for attachment to the forward end of a power operated pivotally mounted boom of a tractor, the raking apparatus comprising frame means, means attached to the frame means for pivotal attachment thereof to the boom, rake means rotatably carried by the frame means, and motor means joined to the rake means for rotation thereof, the frame means including a pair of frame structures, each frame structure having a forward frame member and a rearward frame member substantially parallel thereto, both of the frame structures being disposed forwardly of the tractor, each of the frame structures being rearwardly inclined with the forward portion thereof being forwardly of the central portion of the tractor, one of the frame structures being rearwardly inclined at the left portion of the tractor, the other frame structure being rearwardly inclined at the right portion of the tractor, connector means attaching the frame structures one to the other, means pivotally attaching the connector means to the boom of the tractor, rotary rake means carried by each the frame structures, rotary fluid motor means attached to each of the rotary rake means, fluid pump means, fluid conductor means joining the fluid pump means to the rotary fluid motor means.

References Cited

UNITED STATES PATENTS

| | | | |
|---|---|---|---|
| 2,436,475 | 2/1948 | Jones et al. | 56—377 |
| 2,531,934 | 11/1950 | Crose | 56—377 |
| 2,573,971 | 11/1951 | Hoefer | 56—27 |
| 2,672,005 | 3/1954 | Hamilton | 56—377 |
| 2,727,350 | 12/1955 | Kuhlman | 56—376 |
| 2,851,847 | 9/1958 | Van der Lely et al. | 56—377 |
| 2,906,084 | 9/1959 | Weaver | 56—377 |
| 2,944,377 | 7/1960 | Frieburg | 56—376 |

FOREIGN PATENTS

| | | | |
|---|---|---|---|
| 158,523 | 8/1954 | Australia | 56—377 |
| 1,434,370 | 2/1966 | France | 56—377 |

RUSSELL R. KINSEY, Primary Examiner